(12) United States Patent
Kang et al.

(10) Patent No.: US 10,212,576 B2
(45) Date of Patent: Feb. 19, 2019

(54) NEAR FIELD COMMUNICATION DEVICE

(71) Applicant: SAMSUNG ELECTRONICS CO., LTD., Suwon-si, Gyeonggi-Do (KR)

(72) Inventors: Hyunjae Kang, Seoul (KR); Junho Kim, Yongin-si (KR); Yoonjoong Oh, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/602,860

(22) Filed: May 23, 2017

(65) Prior Publication Data

US 2018/0070220 A1  Mar. 8, 2018

(30) Foreign Application Priority Data

Sep. 8, 2016  (KR) .................. 10-2016-0115862
Oct. 17, 2016  (KR) .................. 10-2016-0134502

(51) Int. Cl.

| | |
|---|---|
| *H04W 8/00* | (2009.01) |
| *H04W 4/80* | (2018.01) |
| *H04L 12/26* | (2006.01) |
| *G06K 7/10* | (2006.01) |
| *H04B 5/00* | (2006.01) |
| *H04B 5/02* | (2006.01) |

(52) U.S. Cl.
CPC ........ *H04W 8/005* (2013.01); *G06K 7/10128* (2013.01); *G06K 7/10138* (2013.01); *H04B 5/0031* (2013.01); *H04B 5/0037* (2013.01); *H04B 5/02* (2013.01); *H04L 43/10* (2013.01); *H04W 4/80* (2018.02)

(58) Field of Classification Search
USPC ............................................... 455/41.1–41.3
See application file for complete search history.

(56) References Cited

U.S. PATENT DOCUMENTS

| | | | |
|---|---|---|---|
| 7,926,719 | B2 | 4/2011 | Spiess et al. |
| 8,014,474 | B2 | 9/2011 | Arnitz |
| 8,472,560 | B2 | 6/2013 | Rezayee et al. |
| 8,537,907 | B2 | 9/2013 | Sung |
| 8,675,688 | B2 | 3/2014 | Oh et al. |
| 8,824,961 | B2 | 9/2014 | Royston |

(Continued)

FOREIGN PATENT DOCUMENTS

| | | |
|---|---|---|
| EP | 2472437 | 7/2012 |
| EP | 2541462 | 1/2013 |

(Continued)

*Primary Examiner* — Fayyaz Alam
(74) *Attorney, Agent, or Firm* — F. Chau & Associates, LLC

(57) ABSTRACT

Disclosed is a near field communication device which includes an antenna, a transceiver that transmits and receives a wireless signal through the antenna, a first detection pulse generation circuit that transmits a first detection pulse to the transceiver periodically in a first detection interval, a second detection pulse generation circuit that transmits a second detection pulse to the transceiver in a second detection interval, a start of frame (SOF) detection circuit that detects whether an SOF is received from the transceiver, in the second detection interval, and a control block that determines that a second near field communication device is present, when the SOF detection circuit detects the SOF.

20 Claims, 13 Drawing Sheets

(56) References Cited

U.S. PATENT DOCUMENTS

| | | |
|---|---|---|
| 8,983,409 B2 | 3/2015 | Ngo et al. |
| 9,106,268 B2 | 8/2015 | Luong et al. |
| 9,218,518 B2 | 12/2015 | Kim et al. |
| 2010/0141378 A1 | 6/2010 | Lee et al. |
| 2011/0206142 A1* | 8/2011 | Sung ................ H04L 69/22 375/259 |
| 2011/0274141 A1* | 11/2011 | Jantunen ............ H04B 1/7183 375/138 |
| 2012/0045989 A1* | 2/2012 | Suumaki ............. H04W 8/005 455/41.1 |
| 2013/0005242 A1* | 1/2013 | Royston ........... G06K 7/10138 455/41.1 |
| 2013/0143488 A1* | 6/2013 | Royston ........... G06K 7/10237 455/41.1 |
| 2013/0203355 A1 | 8/2013 | Ootani |
| 2013/0225071 A1* | 8/2013 | Royston ............. H04B 5/0031 455/41.1 |
| 2014/0263643 A1* | 9/2014 | Kim ................... G06K 7/083 235/439 |
| 2016/0086002 A1* | 3/2016 | Kang .............. G06K 7/10128 340/10.3 |

FOREIGN PATENT DOCUMENTS

| | | |
|---|---|---|
| JP | 2009003509 | 1/2009 |
| JP | 5282498 | 9/2013 |
| KR | 100659180 | 12/2006 |
| KR | 101114179 | 2/2012 |
| KR | 101189286 | 10/2012 |
| KR | 1020140112240 | 9/2014 |
| KR | 101500337 | 3/2015 |
| KR | 1020160033859 | 3/2016 |

* cited by examiner

NEAR FIELD COMMUNICATION DEVICE

CROSS-REFERENCE TO RELATED APPLICATIONS

This application claims priority under 35 U.S.C. § 119 to Korean Patent Application Nos. 10-2016-0115862 filed Sep. 8, 2016, and 10-2016-0134502 filed Oct. 17, 2016, in the Korean Intellectual Property Office, the disclosures of which are incorporated by reference herein.

BACKGROUND

1. Technical Field

Embodiments of the inventive concept disclosed herein relate to a wireless communication device, and more particularly, to a near field communication device.

2. Discussion of Related Art

Radio frequency identification (RFID) uses electromagnetic fields to automatically identify and track tags attached to objects. Passive tags collect energy from a nearby RFID reader's interrogating radio waves. Near field communication (NFC) is a type of RFID. NFC enables two electronic devices to communicate with one another when they are brought close to one another.

As an NFC device is miniaturized, an antenna of the NFC device is also miniaturized. However, the miniaturization of the antenna makes it difficult for the NFC device to detect another NFC device. Accordingly, there is a need for a NFC device that recognizes another NFC device more accurately and rapidly even after being miniaturized.

SUMMARY

At least one embodiments of the inventive concept provides a near field communication (NFC) device that recognizes another NFC device more accurately and rapidly.

According to an exemplary embodiment of the inventive concept, a near field communication device includes an antenna, a transceiver that transmits and receives a wireless signal through the antenna, a first detection pulse generation circuit that transmits a first detection pulse to the transceiver periodically in a first detection interval, a second detection pulse generation circuit that transmits a second detection pulse to the transceiver in a second detection interval, a start of frame (SOF) detection circuit that detects whether an SOF is received from the transceiver, in the second detection interval, and a control circuit that determines that a second near field communication device is present, when the SOF detection block detects the SOF.

According to an exemplary embodiment of the inventive concept, a near field communication (NFC) device includes an antenna, a transceiver that transmits and receive a wireless signal through the antenna, a first detection pulse generation circuit that transmits a first detection pulse to the transceiver periodically in a first detection interval, a second detection pulse generation circuit that transmits a second detection pulse to the transceiver in a second detection interval, and a frame detection circuit that determines that a second near field communication device is present, when a part of a frame is received from the transceiver in the second detection interval and to determine a near field communication type of the second near field communication device based on the received part of the frame.

According to an exemplary embodiment of the inventive concept, a near field communication device includes an antenna and a transceiver configured to wirelessly transmit a plurality of first detection pulses through the antenna during a first time period, determine whether a first message is received wirelessly through the antenna in response to the first detection pulse, transmit a single second detection pulse during a second time period when it is determined that the first message is not received, and determine that a second NFC device is present when a part of a second message is received wirelessly through the antenna in response to the second detection pulse.

BRIEF DESCRIPTION OF THE FIGURES

The inventive concept will become apparent from the following description with reference to the following figures, wherein like reference numerals refer to like parts throughout the various figures unless otherwise specified, and wherein.

DETAILED DESCRIPTION OF THE EXEMPLARY EMBODIMENTS

Hereinafter, exemplary embodiments of the inventive concept will be described with reference to accompanying drawings. Below, details, such as detailed configurations and structures, are provided to aid a reader in understanding embodiments of the inventive concept. Therefore, embodiments described herein may be variously changed or modified without departing from embodiments of the inventive concept.

Figure 1:
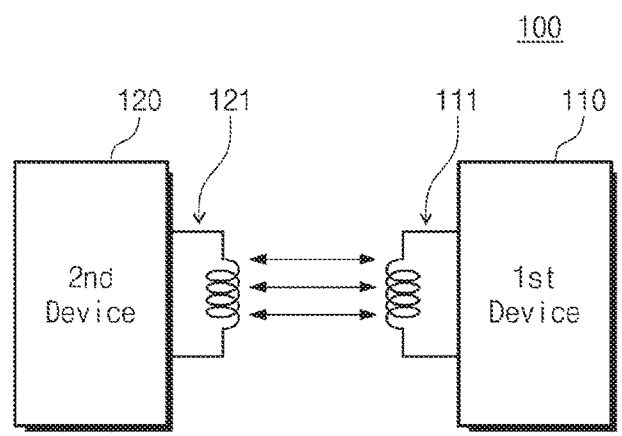
FIG. 1 shows an example of a near field communication (NFC) system.

FIG. 1 shows an example of a near field communication (NFC) system 100. Referring to FIG. 1, the NFC system 100 includes first and second NFC devices 110 and 120. The first NFC device 110 is connected to a first antenna, and the second NFC device 120 is connected to a second antenna 121.

Each of the first and second NFC devices 110 and 120 may operate in a reader mode or a card mode. For example, the first NFC device 110 may operate in the reader mode, and the second NFC device 120 may operate in the card mode. The first NFC device 110 operating in the reader mode transmits a first signal to the second NFC device 120 through electromagnetic induction between the first antenna 111 and the second antenna 121. The first signal may include a continuous wave for transmitting power and a first information signal added to the continuous wave for transmitting information.

The second NFC device 120 may obtain power from the continuous wave of the first signal. The second NFC device 120 may obtain information from the first information signal of the first signal. The second NFC device 120 may add a second information signal for transmitting information to the continuous wave of the first signal to generate an added result and may transmit the added result to the first NFC device 110. For example, the second NFC device 120 may transmit a second signal to the first NFC device 110 through electromagnetic induction between the second antenna 121 and the first antenna 111.

The NFC devices 110 and 120 may be provided as components of mobile devices such as a smartphone and a smart pad. As the mobile devices such as a smartphone and a smart pad are miniaturized, the NFC devices 110 and 120 and the antennas 111 and 121 are also miniaturized. The miniaturizing of the antennas 111 and 121 may cause a reduction of accuracy and speed when the NFC devices 110 and 120 detect each other. In particular, if a material of a body in which the antennas 111 and 121 are mounted has conductivity like a metal, the accuracy and speed when the NFC devices 110 and 120 detect each other may further decrease. According to an embodiment of the inventive concept, the NFC devices 110 and 120 may provide improved detection accuracy and speed even though the antennas are miniaturized.

Figure 2:
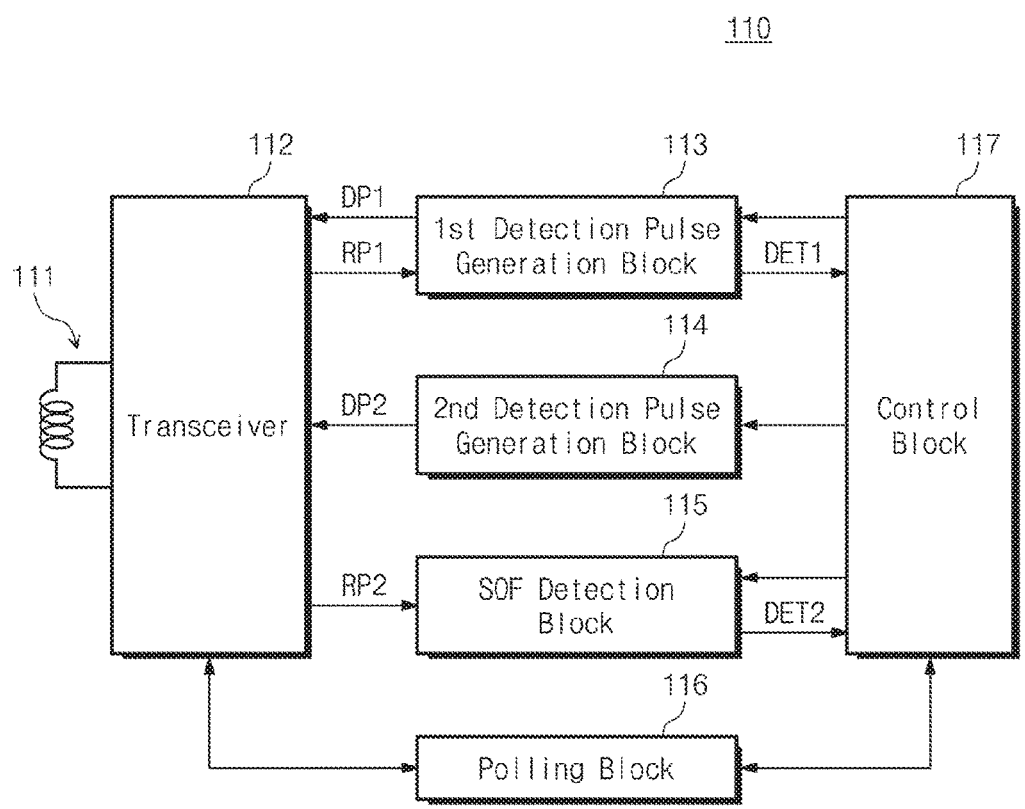
FIG. 2 is a block diagram illustrating an NFC device, according to an exemplary embodiment of the inventive concept.

FIG. 2 is a block diagram illustrating the NFC device 110, according to an exemplary embodiment of the inventive concept. Referring to FIG. 2, the NFC device 110 includes the antenna 111, a transceiver 112, a first detection pulse generation block 113 (e.g., a first circuit), a second detection pulse generation block 114 (e.g., a second circuit), a start of frame (SOF) detection block 115 (e.g., a third circuit), a polling block 116 (e.g., a fourth circuit), and a control block 117 (e.g., a control circuit). In an embodiment, one or more of the first detection pulse generation block 113, the second detection pulse generation block 114, the SOF detection block 115, the polling block 116, and the control block 117 are located within the transceiver 112. In an embodiment, the transceiver 112 performs one or more of the functions provided by the first detection pulse generation block 113, the second detection pulse generation block 114, the SOF detection block 115, the polling block 116, and the control block 117.

In an embodiment, the transceiver 112 is configured to wirelessly transmit signals, which are received from the first detection pulse generation block 113, the second detection pulse generation block 114, the SOF detection block 115, and the polling block 116, through the antenna 111. For example, the transceiver 112 may wirelessly transmit a first detection pulse DP1 from the first detection pulse generation block 113 and a second detection pulse DP2 from the second detection pulse generation block 114 through the antenna 111.

The transceiver 112 may transmit signals, which are wirelessly received through the antenna 111, to the first detection pulse generation block 113, the SOF detection block 115, and the polling block 116. For example, the transceiver 112 may receive a first response pulse RP1 (e.g., a first message) and a second response pulse RP2 (e.g., a second message) from an external device (e.g., the second device 120) through the antenna 111. In an embodiment, the transceiver 112 transmits the first response pulse RP1 to the first detection pulse generation block 113 and transmits the second response pulse RP2 to the SOF detection block 115.

In an embodiment, the first detection pulse generation block 113 generates the first detection pulse DP1 under control of the control block 117 and outputs the first detection pulse DP1 to the transceiver 112. The first detection pulse DP1 may be a detection pulse that is defined in the NFC standard. In an embodiment, the first detection pulse generation block 113 monitors whether the first response pulse RP1 is received from the external device (e.g., the second device 120) by the transceiver 112 as a response to the first detection pulse DP1. In an embodiment, the first detection pulse generation block 113 transmits a first detection signal DET1 to the control block 117 when the first response pulse RP1 is received by the transceiver 112.

In an embodiment, the second detection pulse generation block 114 generates the second detection pulse DP2 under control of the control block 117 and outputs the second detection pulse DP2 to the transceiver 112. The second detection pulse DP2 may have a different shape from the first detection pulse DP1. For example, the second detection pulse DP2 may be a pulse of a command (e.g., REQA, REQB, SENSF_REQ, or INVENTORY) defined in the NFC standard. The second detection pulse DP2 may have a shape of a command pulse defined in the NFC standard, and a guard time of the second detection pulse DP2 may be shorter than that of the command pulse. The guard time may be used to ensure that distinct transmissions do not interference within one another.

In an embodiment, the SOF detection block 115 monitors whether the second response pulse RP2 responding to the second detection pulse DP2 is received from the external device (e.g., the second device 120) by the transceiver 112. In an embodiment, the SOF detection block 115 transmits a second detection signal DET2 to the control block 117 when the second response pulse RP2 is received by the transceiver 112.

In an embodiment, the polling block 116 performs a polling operation under control of the control block 117. For example, the polling operation may be an identification procedure that is performed for the NFC device 110 to communicate with another NFC device, that is, the second NFC device 120 and may be defined by the NFC standard. In an embodiment, the polling block 116 performs a polling operation in one of a first mode and a second mode under control of the control block 117. For example, when the control block 117 receives the first detection pulse DET1, the polling block 116 performs the polling operation in the first mode under control of the control block 117. In an embodiment, the polling operation corresponding to the first mode includes sequentially performing polling on a type A, type B, type F, and type V of the NFC. In an embodiment, the polling block 116 performs the polling operation in the second mode under control of the control block 117 when the control block 117 receives the second detection pulse DET2. The polling operation corresponding to the second mode may include performing polling on one or more types, which are selected by the control block 117, of type A, type B, type F, and type V of the NFC. The one or more types may be all or a part of type A, type B, type F, and type V of the NFC.

In an embodiment, an NFC device of type A performs with an RFID Type communication. In type A communication, Miller encoding, also known as delay encoding, is used with amplitude modulation at 100 percent. Data may be transmitted at 106 Kbps when using Type A communication. In an embodiment, an NFC device of type B performs using an RFID Type B communication. In type B communication, Manchester encoding is used with amplitude modulation at 10 percent. In an embodiment, an NFC device of type F performs an RFID transmission known as FeliCa, which is based on FeliCA JIS X6319-4. In an embodiment, an NFC device of type V is compatible with tags implementing the ISO/EIC 15693 standard.

The NFC device 110 is described as including various blocks. The blocks included in the NFC device 110 may be implemented with hardware such as a semiconductor circuit or an integrated circuit, software driven in an integrated circuit, or a combination of hardware and software.

Figure 3:
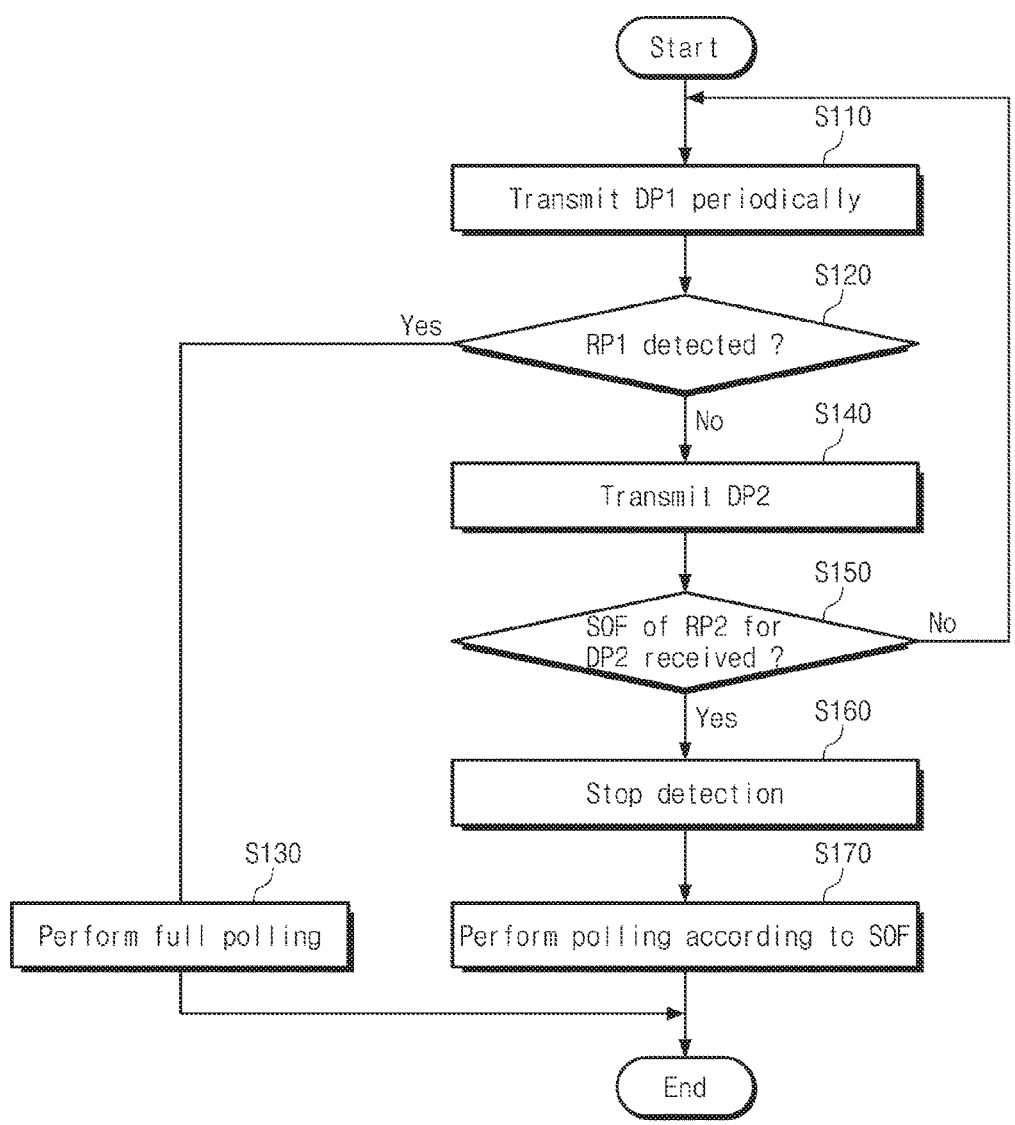
FIG. 3 is a flowchart illustrating an operating method of the near field communication device, according to an exemplary embodiment of the inventive concept.
Figure 4:
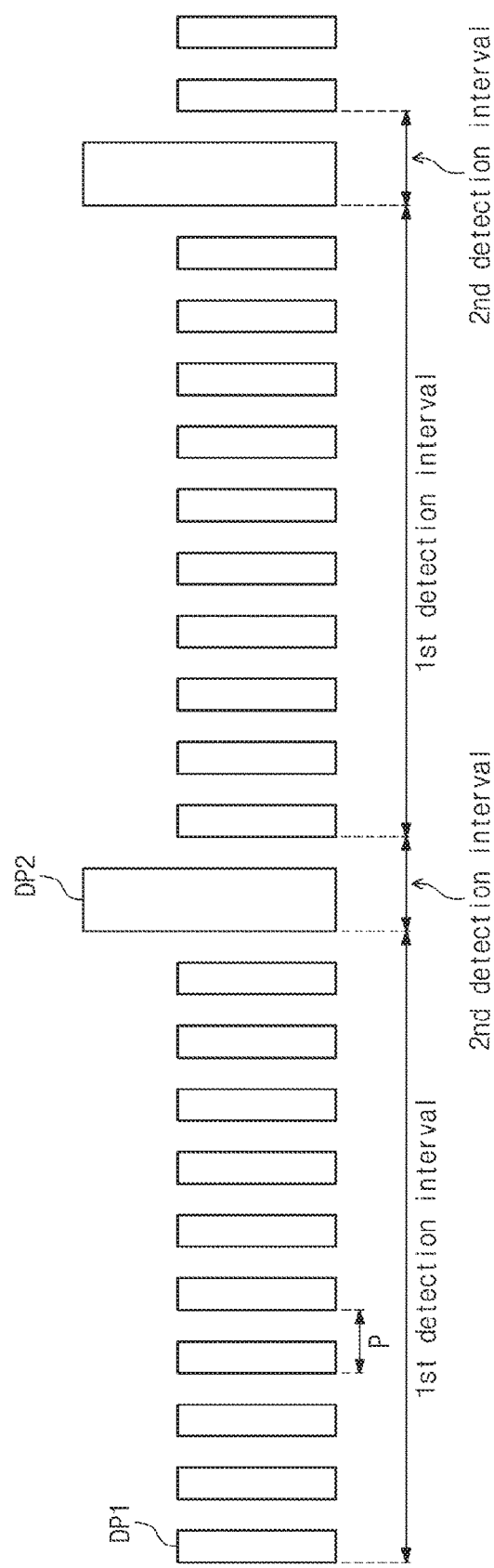
FIG. 4 shows an example in which the NFC device outputs a first detection pulse and a second detection pulse based on the operating method of FIG. 3.

FIG. 3 is a flowchart illustrating an operating method of the NFC device 110, according to an exemplary embodiment of the inventive concept. FIG. 4 shows an example in which the NFC device 110 outputs the first detection pulse DP1 and the second detection pulse DP2 based on the operating method of FIG. 3. Referring to FIGS. 2 to 4, in operation S110, the NFC device 110 transmit the first detection pulse DP1 periodically. An example in which the first detection pulse DP1 is transmitted is illustrated in a first detection interval of FIG. 4. The first detection pulse DP1 may be transmitted based on a period P.

In operation S120, the NFC device 110 determines whether the first response pulse RP1 is detected. That the first response pulse RP1 is detected means that the second NFC device 120 receiving the first detection pulse DP1 is on the periphery (e.g., within an identification distance of the first detection pulse DP1) of the NFC device 110. Accordingly, in operation S130, the NFC device 110 performs a full polling operation, for example, a polling operation in the first mode (and stops detection of RP1 and/or RP2). If a communication channel between the NFC devices 110 and 120 is established through the polling operation in the first mode, the NFC devices 110 and 120 may communicate with each other, for example, may exchange data with each other.

If the first response pulse RP1 is not detected, the process proceeds to operation S140. If the first response pulse RP1 is not received until a time interval defined as the first detection interval elapses or the first detection pulse DP1 is transmitted by the number of times defined in the first detection interval, the process proceeds to operation S140. For example, operation S120 may be repeated until the time interval elapses.

In operation S140, the NFC device 110 transmits the second detection pulse DP2. An example in which the second detection pulse DP2 is transmitted is illustrated in a second detection interval of FIG. 4. The second detection pulse DP2 may include an NFC standard command. In an embodiment, the amplitude of the second detection pulse DP2 is greater than that of the first detection pulse DP1. That is, a detection (or detectable) distance of the second detection pulse DP2 may be longer than that of the first detection pulse DP1. In an embodiment, the amplitude of the first detection pulses DP1 transmitted during the first detection interval are the same as one another.

In operation S150, the NFC device 110 determines whether a start of frame SOF of the second response pulse RP2 corresponding to the second detection pulse DP2 is received. If the SOF of the second response pulse RP2 is not received, the process proceeds to operation S110, in which the first detection interval restarts. If the SOF is detected, the process proceeds to operation S160.

In operation S160, if the SOF is detected, the NFC device 110 stops detection. For example, the NFC device 110 may stop detecting the RP2 and/or RP1 without performing operations that are associated with a detection operation performed when the SOF is not detected.

In operation S170, the NFC device 110 performs a polling operation based on the SOF. For example, the NFC device 110 may identify a NFC type from the SOF. The NFC device 110 may perform the polling operation in the second mode in which the polling operation is performed only on the identified type instead of the full polling operation in operation S130, that is, the polling operation corresponding to the first mode. If a communication channel between the NFC devices 110 and 120 is established through the polling operation in the second mode, the NFC devices 110 and 120 may communicate with each other, for example, may exchange data with each other.

Figure 5:
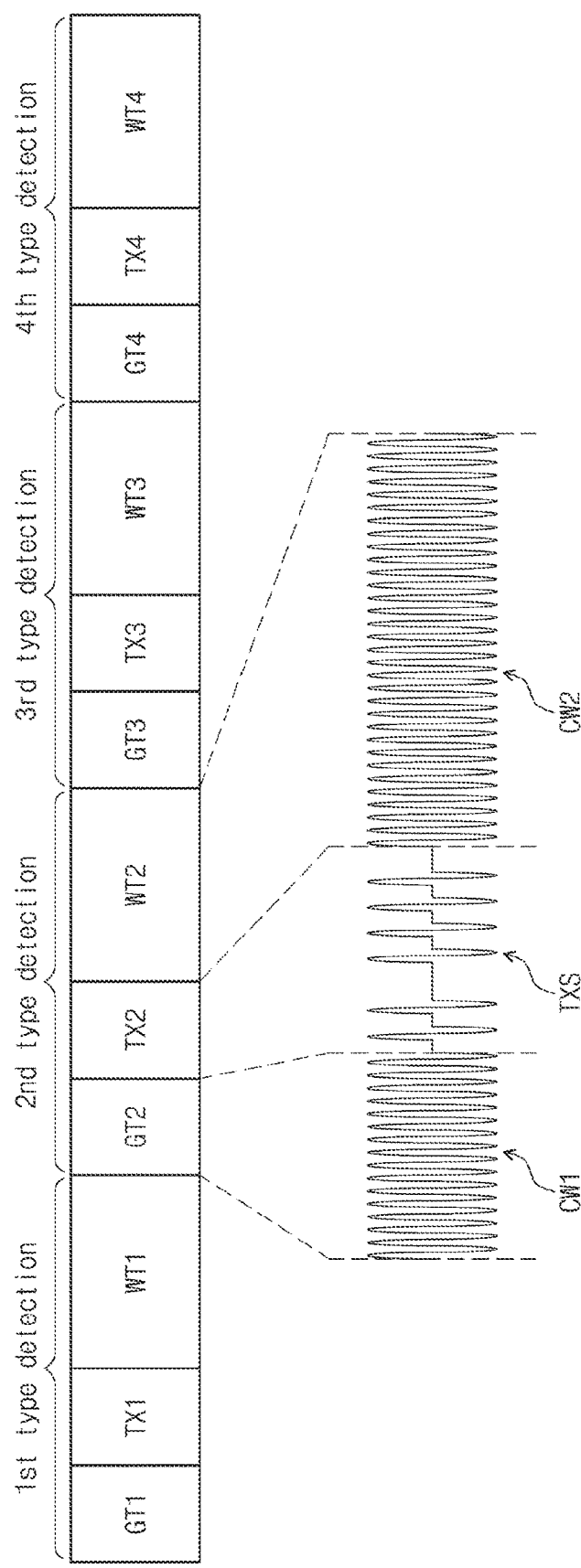
FIG. 5 shows an example of the second detection pulse.

FIG. 5 shows an example of the second detection pulse DP2. Referring to FIGS. 1, 2, and 5, the second detection pulse DP2 includes a first type detection interval, a second type detection interval, a third type detection interval, and a fourth type detection interval.

The first type detection interval may correspond to one of type A, type B, type F, and type V of the NFC. The first type detection interval includes a first guard time sequence GT1, a first transmission sequence TX1, and a first waiting time sequence WT1. The second type detection interval may correspond to another of type A, type B, type F, and type V of the NFC. The second type detection interval includes a second guard time sequence GT2, a second transmission sequence TX2, and a second waiting time sequence WT2. The third type detection interval may correspond to another of type A, type B, type F, and type V of the NFC. The third type detection interval includes a third guard time sequence GT3, a third transmission sequence TX3, and a third waiting time sequence WT3. The fourth type detection interval may correspond to the other of type A, type B, type F, and type V of the NFC. The fourth type detection interval includes a fourth guard time sequence GT4, a fourth transmission sequence TX4, and a fourth waiting time sequence WT4. In an embodiment, the guard time sequences GT1 to GT4 of the first to fourth type detection intervals is shorter than a guard time defined in the NFC standard.

In the first to fourth type detection intervals, the guard time sequences GT1 to GT4 may be configured the same, the transmission sequences TX1 to TX4 may be configured the same, and the waiting time sequences WT1 to WT4 may be configured the same. The second guard time sequence GT2, the second transmission sequence TX2, and the second waiting time sequence WT2 are more fully illustrated in FIG. 5.

In the second guard time sequence GT2, the NFC device 110 supplies power or clock to the second NFC device 120. In the second guard time sequence GT2, the NFC device 110 may wirelessly transmit a first continuous wave CW1. For example, the NFC device 120 may be powered or clocked by the first continuous wave CW1.

In the second transmission sequence TX2, the NFC device 110 transmits a transmit signal TXS to the second NFC device 120. In the second transmission sequence TX2, the NFC device 110 may wirelessly transmit the transmit signal TXS. For example, active load modulation may be performed on the transmit signal TXS. The transmit signal TXS may include data that can be operated on by the second NFC device 120. For example, the data may include an identifier.

In the second waiting time sequence WT2, the NFC device 110 waits until a signal (e.g., defined in the NFC standard) is received from the second NFC device 120 or until a predefined time (e.g., defined in the NFC standard) elapses without any signal (e.g., defined in the NFC standard) reception. In the second waiting time sequence WT2, the NFC device 110 may wirelessly transmit a second continuous wave CW2.

Figure 6:
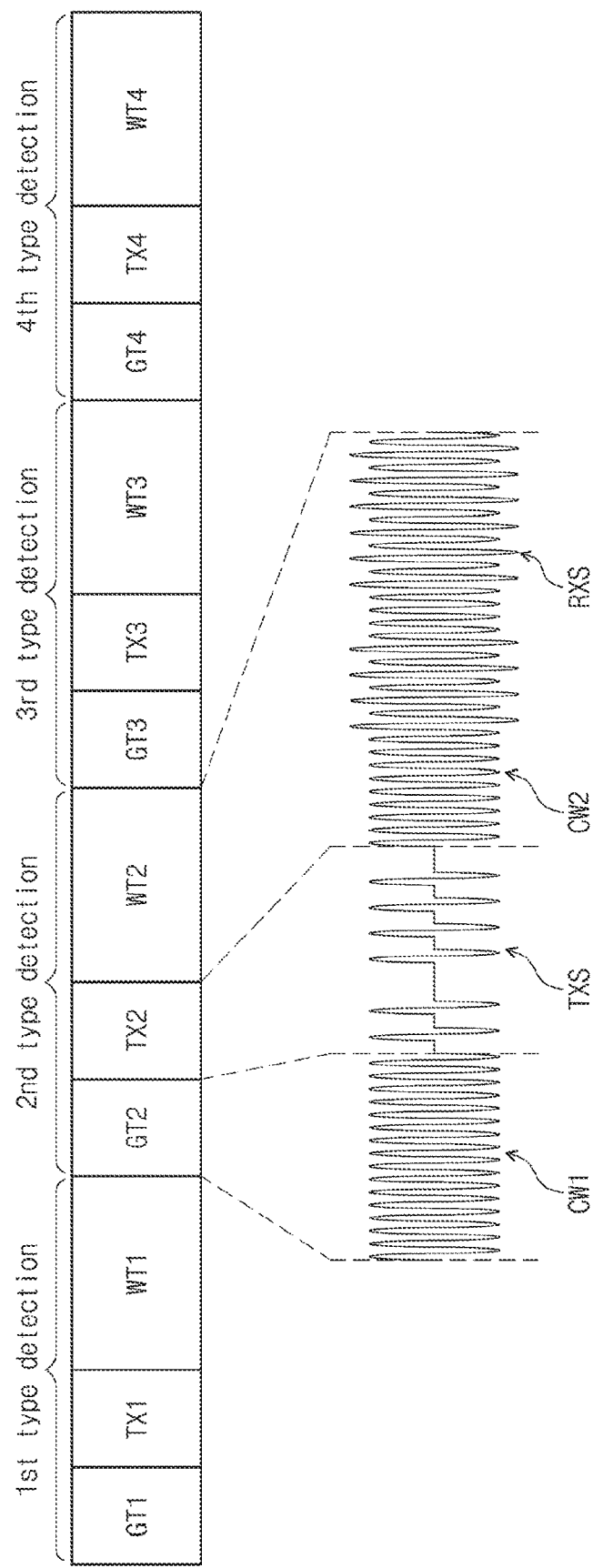
FIG. 6 shows an example in which a receive signal is received in a second waiting time sequence.

FIG. 6 shows an example in which a receive signal RXS is received in the second waiting time sequence WT2. Referring to FIGS. 1, 2, and 6, the second NFC device 120 generates and outputs the receive signal RXS in response to the transmit signal TXS from the first NFC device 110. For example, the second NFC device 120 may generate the receive signal RXS by modulating the second continuous wave CW2 of the second waiting time sequence WT2. The receive signal RXS may appear in the antenna 111 and the transceiver 112 of the first NFC device 110 in a state where the receive signal RXS is mixed with the second continuous wave CW2.

Figure 7:
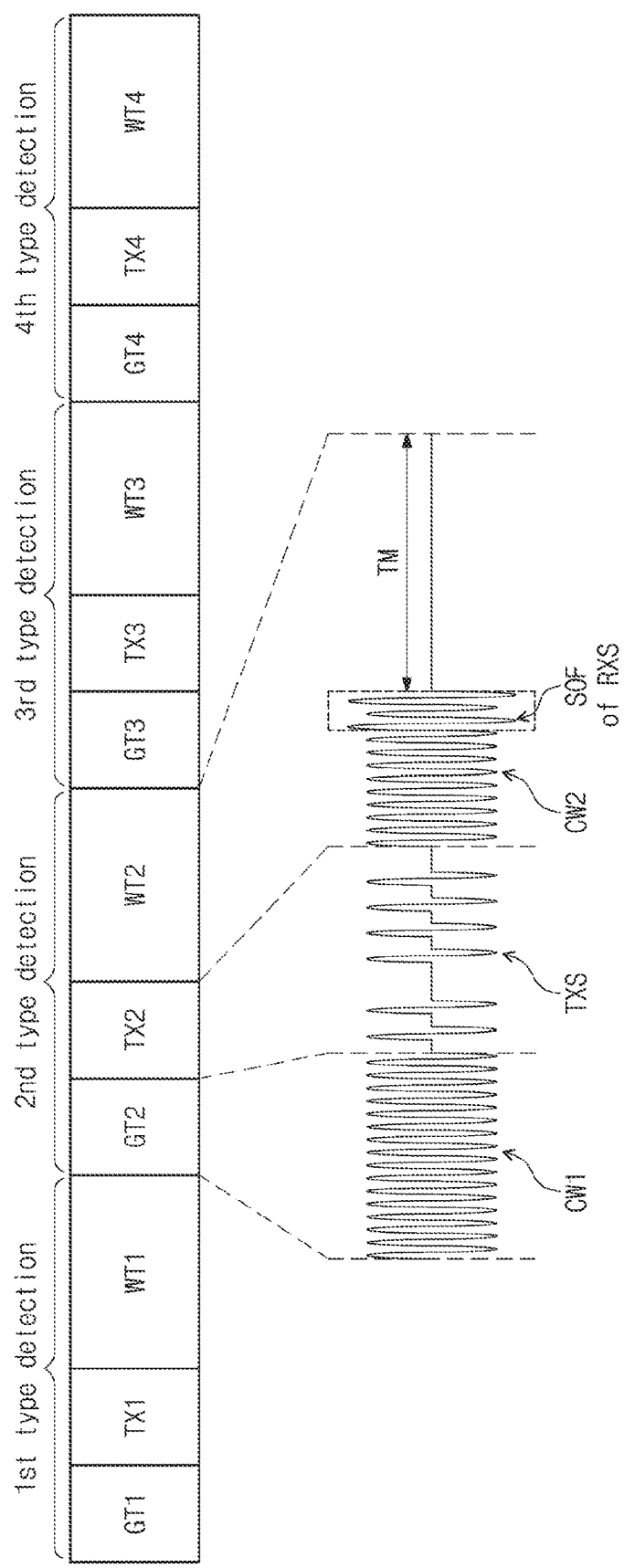
FIG. 7 shows an example in which the NFC device receives a start of frame SOF and stops detecting the SOF.

FIG. 7 shows an example in which the first NFC device 110 receives a start of frame SOF and stops detecting the SOF. For example, the first NFC device 110 can cancel the process it is currently using to detect the SOF as soon it is detects the SOF. Referring to FIGS. 1, 2, and 7, when the SOF is detected, the first NFC device 110 stops detecting the SOF. For example, the first NFC device 110 may stop an output of the second continuous wave CW2 in the second waiting time sequence WT2. For example, the first NFC device 110 may stop the second waiting time sequence WT2 and may immediately start the third type detection interval. For example, the first NFC device 110 stops the second waiting time sequence WT2 and does not perform the remaining detection processes such as the third type detection interval and the fourth type detection interval. In an embodiment, the amplitude of the second continuous wave CW2 is less than the amplitude of the SOF.

As described above, in an embodiment of the inventive concept, the first NFC device 110 performs a detection operation by using the second detection pulse DP2, of which an amplitude is greater than that of the first detection pulse DP1. Accordingly, a detection distance of the first NFC device 110 may be extended and accuracy of detection may be improved. Also, when the SOF of the second response pulse RP2 corresponding to the second detection pulse DP2 is received, the first NFC device 110 completes the detection operation. The first NFC device 110 may perform the detection operation more rapidly, and thus, power consumption for the detection operation may decrease.

Figure 8:
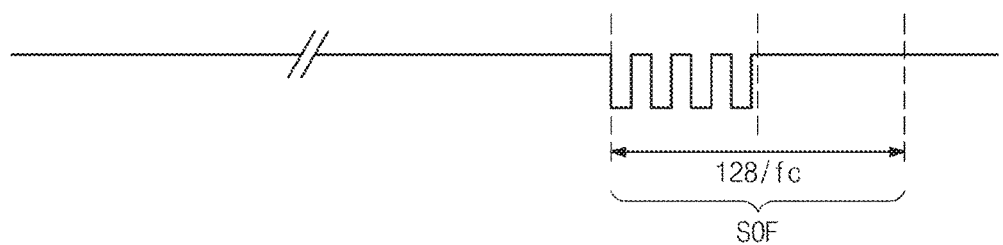
FIG. 8 shows an example of a start of frame SOF of type A of near field communication.

FIG. 8 shows an example of a start of frame SOF for a type A near field communication (NFC). Referring to FIG. 8, the SOF of type A includes a first interval in which the SOF has a low-to-high transition and a high-to-low transition and a second interval in which the SOF remains at a high level. The first interval may include many of these low-high transitions (e.g., many pulses). A length of the SOF may correspond to a value that is obtained by dividing 128 by a center frequency fc. The center frequency fc may be 13.56 MHz.

Figure 9:
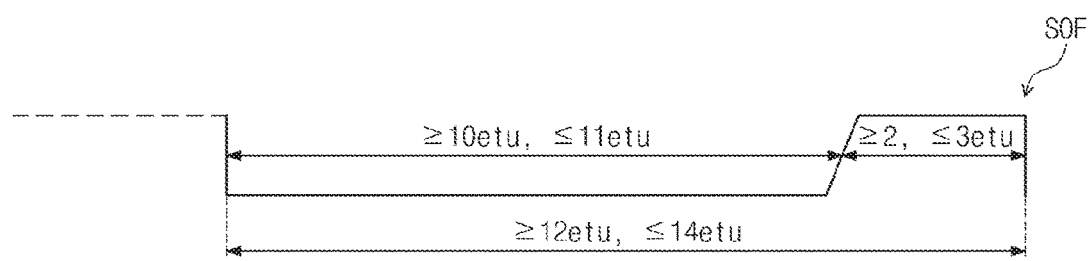
FIG. 9 shows an example of a start of frame SOF of type B of near field communication.

FIG. 9 shows an example of a start of frame SOF for a type B near field communication (NFC). Referring to FIG. 9, the SOF of not less than 12 Elementary Time Units (ETUs) and not more than 14 ETUs, which corresponds to type B, includes a low level interval, which is not less than 10 ETUs and is not more than 11 ETUs, and a high level interval, which is not less than 2 ETUs and is not more than 3 ETUs. For example, 1 ETU may be a minimum of 9.4346 us, a maximum of 9.4444 us, and an average of 9.4395 us.

Figure 10:
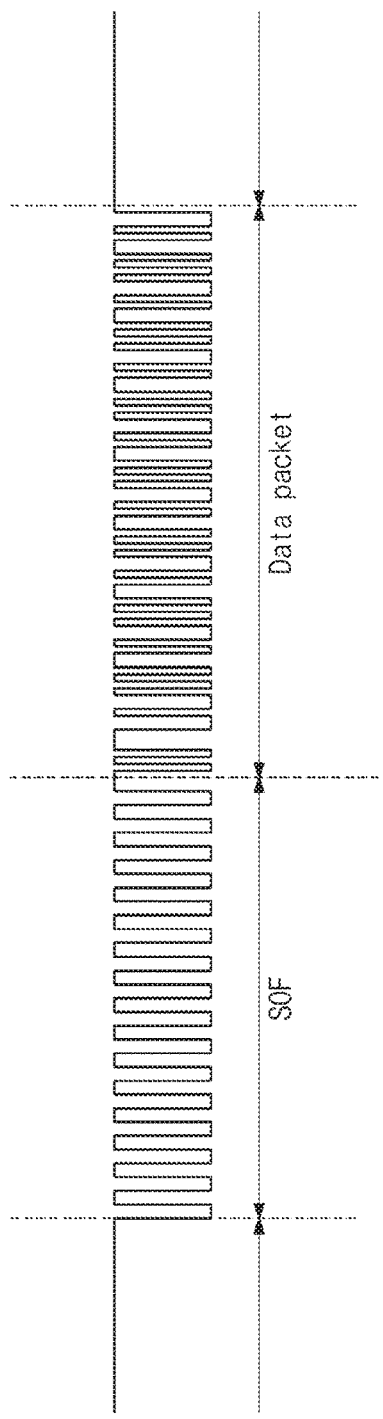
FIG. 10 shows an example of a start of frame SOF of type F of near field communication.

FIG. 10 shows an example of a start of frame SOF for a type F near field communication (NFC). Referring to FIG. 10, the SOF of type F may be in the form in which a minimum of 48 bits, each of which is logic "0", are encoded. A data packet may be transmitted following the SOF. For example, the first NFC device 110 can conclude it has detected the SOF of the type F as soon it has detected 48 consecutive 0s.

Figure 11:
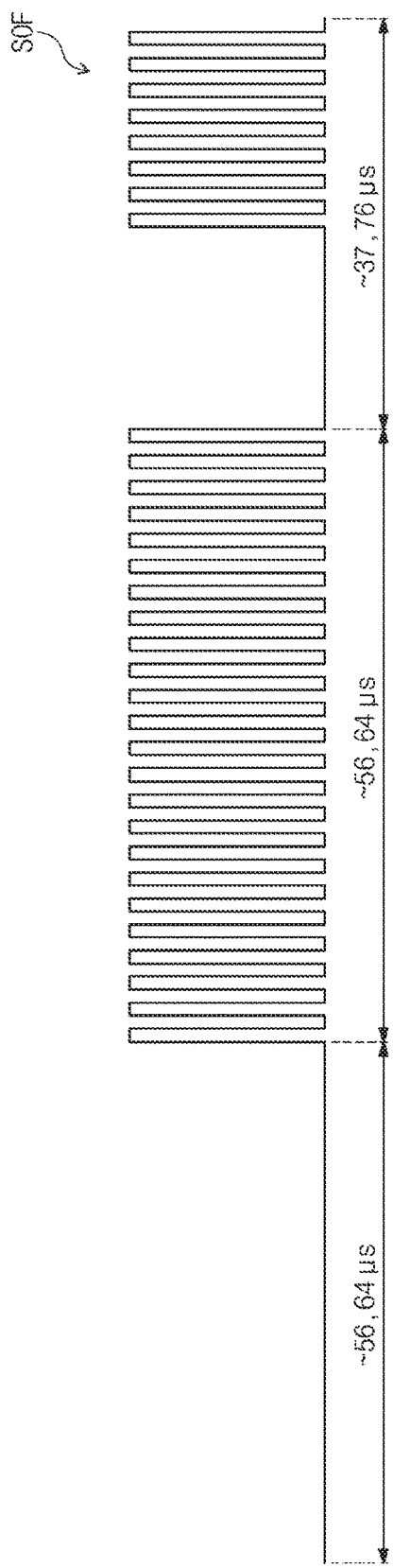
FIG. 11 shows an example of a start of frame SOF of type V of near field communication.

FIG. 11 shows an example of a start of frame SOF for a type V near field communication (NFC). The SOF of type V includes a first interval in which the SOF has a low level for 55.64 us or less, a second interval in which the SOF transitions between a high level and a low level for 55.64 us or less, and a third interval in which the SOF remains at a low level during half a time of 37.76 us or less and transitions between a high level and a low level during the remaining time. For example, there may be multiple transitions during the second interval and during the first half of the third interval.

As described with reference to FIGS. 8 to 11, the SOFs of type A, type B, type F, and type V of the near field communication have different patterns. Accordingly, on the basis of only the SOF, the first NFC device 110 (refer to FIG. 2) may identify whether another NFC device (e.g., 120) exists and whether another NFC device (e.g., 120) has any type. For example, the first NFC device 110 may store the different patterns, perform a detection to detect a pattern in a receive signal, and compare the detected pattern against the stored patterns to determine that another NFC device is present and the type of its NFC communication.

Figure 12:
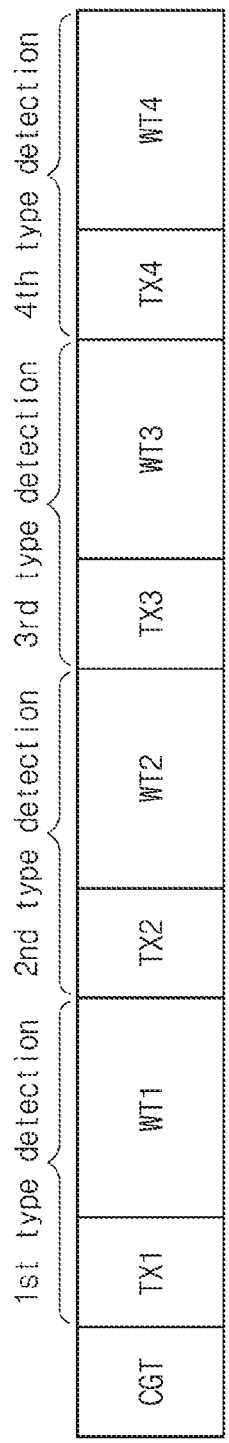
FIG. 12 shows an application of the second detection pulse.

FIG. 12 shows an application of the second detection pulse DP2. Referring to FIG. 12, the second detection pulse DP2 includes a common guard time sequence CGT and first to fourth type detection intervals. Each detection interval may include a transmission sequence TX and a waiting time sequence WT.

Compared with the second detection pulse DP2 of FIGS. 5 to 7, each of the first to fourth first type detection intervals do not include a guard time sequence separately. Instead, the second detection pulse DP2 includes one common guard time sequence CGT that is applied in common to the first to fourth first type detection intervals. In an embodiment, a length of the common guard time sequence CGT is the same as the length of a longest one of the guard time sequences that respectively correspond to the first to fourth type detection intervals.

Figure 13:
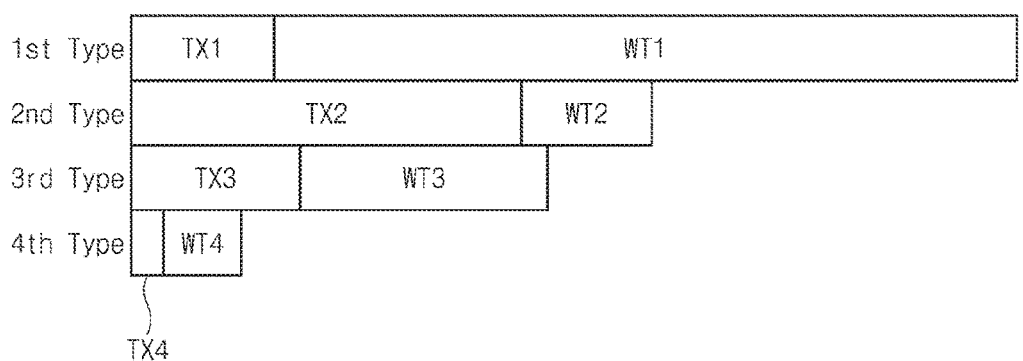
FIG. 13 shows examples of transmission sequences and waiting time sequences of first to fourth types.

FIG. 13 shows examples of transmission sequences and waiting time sequences of first to fourth types. Referring to FIG. 13 a first type, a second type, a third type, and a fourth type respectively correspond to type A, type B, type F, and type V. Lengths of a transmission sequence and a waiting time sequence of each type may be determined by the NFC standard.

As illustrated in FIG. 13, a length of a waiting time sequence changes based on the NFC type. In an embodiment, WT4<WT2<WT3<WT1. According to an embodiment of the inventive concept, the NFC device 110 may reduce a time to detect by making a waiting time sequence of one type and a transmission sequence of another type overlap each other.

Figure 14:
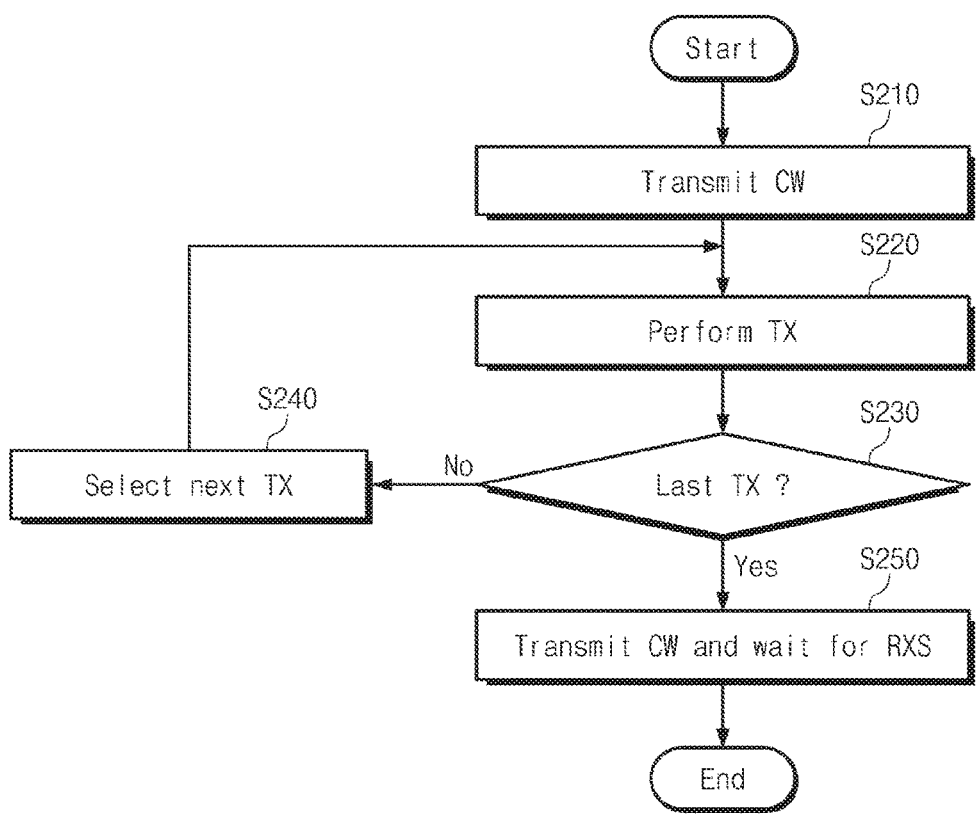
FIG. 14 shows an application of an operating method of the NFC device, according to an exemplary embodiment of the inventive concept.

FIG. 14 shows an application of an operating method of the NFC device 110, according to an exemplary embodiment of the inventive concept. Referring to FIGS. 2 and 14, in operation S210, the NFC device 110 transmits a continuous wave CW. For example, the continuous wave CW may be a continuous wave of a guard time sequence.

In operation S220, the NFC device 110 performs a transmission sequence TX. In operation S230, the NFC device 110 determines whether the performed transmission sequence TX is the last transmission sequence. For example, the NFC device 110 may determine whether the last transmission sequence among transmission sequences, which are set to be transmitted while the transmission sequences overlap each other, is performed. If the performed transmission sequence TX is not the last transmission sequence, the process proceeds to operation S240, in which a next transmission sequence is selected. Afterwards, the process proceeds to operation S220, in which the next transmission sequence is performed. If the performed transmission sequence TX is the last transmission sequence, the process proceeds to operation S250.

In operation S250, the NFC device 110 transmits the continuous wave CW and waits for a receive signal RXS. For example, the NFC device 110 may perform a reception sequence.

That is, after sequentially performing two or more transmission sequences, the NFC device 110 may enter a common waiting time sequence corresponding to the two or more transmission sequences.

Figure 15:
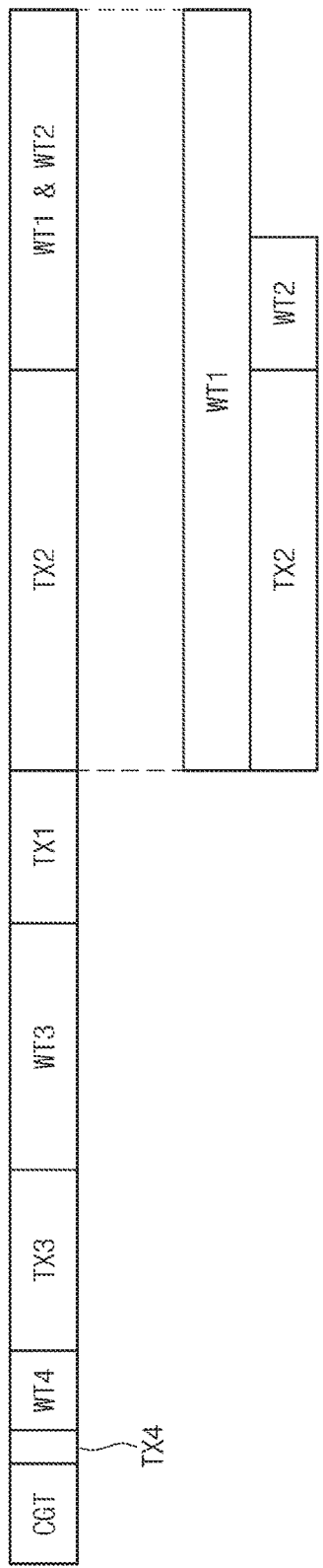
FIG. 15 shows an example in which sequences illustrated in FIG. 13 overlap each other based on a method illustrated in FIG. 14.

FIG. 15 shows an example in which sequences illustrated in FIG. 13 overlap each other based on a method illustrated in FIG. 14. Referring to FIGS. 13 and 15, a fourth type including a fourth transmission sequence TX4 and a fourth waiting time sequence WT4 is detected after the common guard time sequence CGT. Afterwards, a third type including a third transmission sequence TX3 and a third waiting time sequence WT3 is detected.

In an exemplary embodiment, afterwards, operations of detecting a first type and a second type are performed to overlap each other. After a first transmission sequence TX1 of the first type is performed, a waiting time corresponding to the first waiting time sequence WT1 starts to be counted. In an embodiment, the second transmission sequence TX2 of the second type is performed after the first transmission time sequence TX1 is performed. Afterwards, a common waiting time sequence WT1 & WT2 is performed on the first and second types. In an embodiment, a length of a time interval from a point in time when the first transmission sequence TX1 is performed to a point in time when the common waiting time sequence WT1 & WT2 ends is the same as a length of a waiting time sequence, which is relatively long, of waiting time sequences of the first and second types, for example, a length of the first waiting time sequence WT1.

As described above, when transmission and waiting time sequences of the first type are shorter than a waiting time sequence of the second type, the transmission and waiting time sequences of the first type is performed to overlap the waiting time sequence WT2 of the second type. If operations of detecting the first type and the second type overlap each other, a time needed to perform a detection operation may decrease, and thus, the detection operation may be performed more rapidly.

Figure 16:
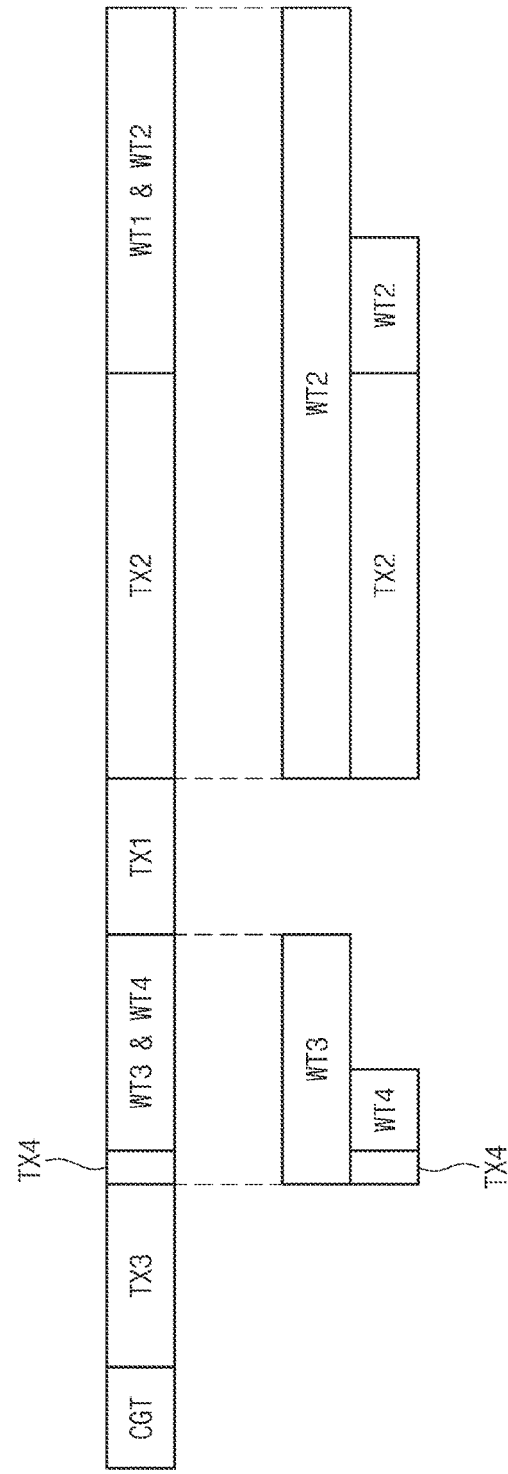
FIG. 16 shows an example in which sequences illustrated in FIG. 13 overlap each other based on a method illustrated in FIG. 14.

FIG. 16 shows an example in which sequences illustrated in FIG. 13 overlap each other based on a method illustrated in FIG. 14. Compared with FIG. 15, the fourth transmission sequence TX4 and the fourth waiting time sequence WT4 further overlap the third waiting time sequence WT3. The third waiting time sequence WT3 and the fourth waiting time sequence WT4 may overlap each other to constitute a first common waiting time sequence WT3 & WT4. A length of a time interval from a point in time when the third transmission sequence TX3 is performed to a point in time when a first common waiting time sequence WT3 & WT4 is determined by the third waiting time sequence WT3, which is relatively long, of the third and fourth waiting time sequences WT3 and WT4.

As described with reference to FIG. 15, the first waiting time sequence WT1 and the second waiting time sequence WT2 overlap each other to constitute a second common waiting time sequence WT1 & WT2.

Figure 17:
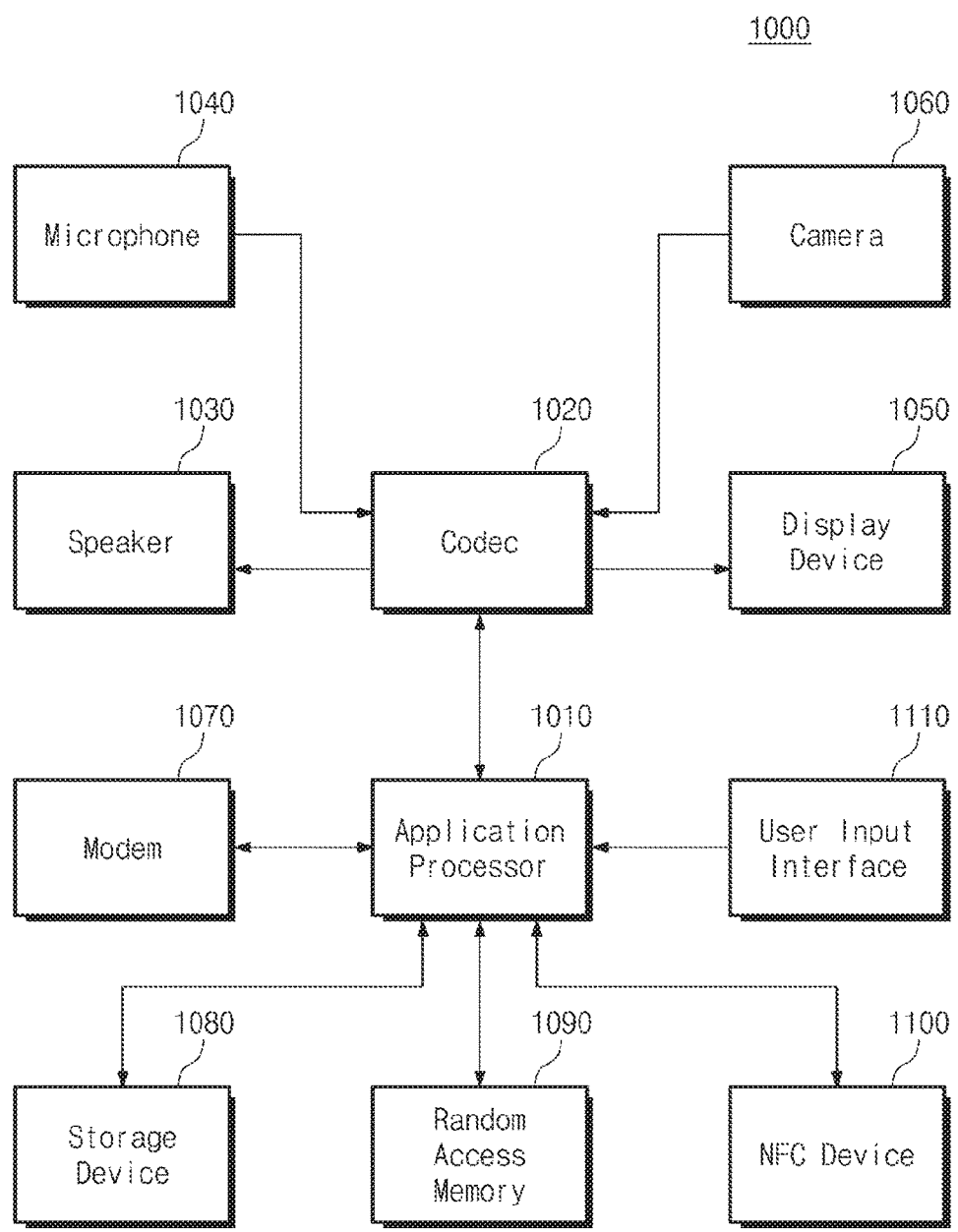
FIG. 17 is a block diagram illustrating a mobile device 1000, according to an exemplary embodiment of the inventive concept.

FIG. 17 is a block diagram illustrating a mobile device 1000, according to an exemplary embodiment of the inventive concept. Referring to FIG. 17, the mobile device 1000 includes an application processor 1010, a codec 1020, a speaker 1030, a microphone 1040, a display device 1050, a camera 1060, a modem 1070, a storage device 1080, a random access memory 1090, and a NFC device 1100.

The application processor 1010 may drive an operating system that operates the mobile device 1000 and may drive various applications on the operating system. The codec 1020 may perform coding and decoding on an image signal. The codec 1020 may perform a task associated with processing a voice signal or an image signal under delegation of the application processor 1010.

The speaker 1030 may play a voice signal from the codec 1020. The microphone 1040 may detect sound sensed from the outside, may convert the detected sound into a voice signal, and may output the voice signal to the codec 1020. The display device 1050 may play an image signal from the codec 1020. The camera 1060 may convert a scene in a range of vision into an electrical image signal and may output the image signal to the codec 1020.

The modem 1070 may perform wireless or wired communication with an external device. In response to a request of the application processor 1010, the modem 1070 may transmit data to an external device or may request data from the external device. The storage device 1080 may be main storage of the mobile device 1000. The storage device 1080 may be used to store data for a long time and may retain data stored therein even at power-off. The random access memory 1090 may be a main memory of the mobile device 1000. The random access memory 1090 may be used for the master devices, such as the application processor 1010, the modem 1070, and the codec 1020, to temporarily store data.

The NFC device 1100 may be the NFC device 110 or 120 described with reference to FIGS. 1 to 16. The NFC device 1100 may operate as a reader (e.g., an NFC reader) or as a card. For example, when the NFC device 1100 operates as a card, it may receive power or clock from the NFC device that acts as a reader. When a start of frame (SOF) of a receive signal is detected, the NFC device 1100 may detect that another NFC device exists on the periphery thereof. Accordingly, a detection speed of the NFC device 1100 may be improved, and thus, a speed of the mobile device 1000 may be improved.

The user input interface 1110 may include various devices for receiving an input from a user. For example, the user input interface 1110 may include devices, which directly receive an input from the user, such as touch panels, touch screens, buttons, and keyboards, or devices, which indirectly receive results generated by actions of the user, such as an optical sensor, a proximity sensor, a gyroscope sensor, and a pressure sensor.

According to an embodiment of the inventive concept, a near field communication device performs a detection operation by using a communication pulse. Accordingly, it may be possible to provide an NFC device that recognizes another NFC device more accurately and rapidly. Also, the near field communication device performs a detection operation by using a start of a frame of the communication pulse. Accordingly, it may be possible to provide an NFC device that recognizes another NFC device more rapidly.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A near field communication (NFC) device comprising:
an antenna;
a transceiver configured to transmit and receive a wireless signal through the antenna;
a first detection pulse generation circuit configured to transmit a first detection pulse to the transceiver periodically during a first detection interval;
a second detection pulse generation circuit configured to transmit a second detection pulse to the transceiver in a second detection interval;
a start of frame (SOF) detection circuit configured to detect whether an SOF is received by the transceiver, in response to the second detection pulse;
a polling circuit configured to perform a polling operation on a plurality of NFC types when a response is received in response to the first detection pulse; and
a control circuit configured to determine that a second near field communication device is present, when the SOF detection circuit detects the SOF.

2. The near field communication device of claim 1, wherein when the SOF detection circuit detects the SOF in the second detection interval, the second detection pulse generation circuit stops outputting a continuous wave for reception.

3. The near field communication device of claim 1, wherein the SOF detection circuit determines an NFC type among the plurality of NFC types of the second near field communication device based on the SOF when the SOF is received.

4. The near field communication device of claim 3,
wherein the polling circuit is configured to perform a polling operation on the determined NFC type.

5. The near field communication device of claim 1, wherein the second detection pulse comprises a plurality of detection intervals that respectively correspond to a plurality of NFC types.

6. The near field communication device of claim 5, wherein each of the detection intervals comprises a guard time sequence in which a continuous wave is output, a transmission sequence in which a transmit signal is output, and a waiting time sequence for waiting for a receive signal while the continuous wave is output.

7. The near field communication device of claim 6, wherein when the SOF is detected in the waiting time sequence of one of the detection intervals, the second detection pulse generation circuit stops outputting the continuous wave of the waiting time sequence.

8. The near field communication device of claim 7, wherein when the SOF is detected in the waiting time sequence of one of the detection intervals, the second detection pulse generation circuit terminates the one of the detection intervals corresponding to the waiting time sequence in which the SOF is detected.

9. The near field communication device of claim 5, wherein the second detection pulse further comprises a guard time sequence that precedes the detection intervals and in which a continuous wave is output, and wherein each of the detection intervals comprises a transmission sequence in which a transmit signal is output and a waiting time sequence for waiting for a receive signal while the continuous wave is output.

10. The near field communication device of claim 9, wherein a length of the guard time sequence is determined by the longest guard time among guard times of the NFC types.

11. The near field communication device of claim 1, wherein the second detection pulse comprises a guard time sequence in which a continuous wave is output, a first transmission sequence in which a first transmit signal of a first type of near field communication is output, a second transmission sequence in which a second transmit signal of a second type of the near field communication is output, and a waiting time sequence for waiting for a receive signal corresponding to at least one of the first transmit signal and the second transmit signal while the continuous wave is output.

12. The near field communication device of claim 11, wherein a length of the waiting time sequence is determined by one of a first waiting time sequence of the first type and a second waiting time sequence of the second type.

13. The near field communication device of claim 1, wherein an amplitude of the second detection pulse is greater than an amplitude of the first detection pulse.

14. A near field communication (NFC) device comprising:
an antenna;
a transceiver configured to transmit and receive a wireless signal through the antenna;
a first detection pulse generation circuit configured to transmit a first detection pulse to the transceiver periodically in a first detection interval;
a second detection pulse generation circuit configured to transmit a second detection pulse to the transceiver in a second detection interval; and
a frame detection circuit configured to determine that a second near field communication device is present, when a part of a frame is received from the transceiver in the second detection interval and to determine a near field communication type of the second near field communication device based on the received part of the frame,
wherein the second detection pulse comprises a plurality of detection intervals that respectively correspond to a plurality of NFC types.

15. The near field communication device of claim 14, wherein the frame detection circuit compares the received part against a first pattern associated with a type A NFC communication, a second pattern associated with a type B NFC communication, a third pattern associated with a type F NFC communication, and a fourth pattern associated with a type V NFC communication to determine the near field communication type.

16. The near field communication device of claim 14, wherein an amplitude of the second detection pulse is greater than an amplitude of the first detection pulse.

17. A near field communication (NFC) device comprising:
an antenna;
a transceiver configured to wirelessly transmit a plurality of first detection pulses through the antenna during a first time period, determine whether a first message is received wirelessly through the antenna in response to the first detection pulse, transmit a single second detection pulse during a second time period when it is determined that the first message is not received, determine that a second NFC device is present when a part of a second message is received wirelessly through the antenna in response to the second detection pulse, and determine whether the second NFC is present as a result of performing a polling operation on a plurality of NFC types in response to the first message.

18. The NFC device of claim 17, wherein an amplitude of the second detection pulse is larger than an amplitude of the first detection pulses.

19. The NFC device of claim 17, wherein the transceiver determines a near field communication type of the second NFC device by comparing the part against a first pattern associated with a type A NFC communication, a second pattern associated with a type B NFC communication, a third pattern associated with a type F NFC communication, and a fourth pattern associated with a type V NFC communication.

20. The NFC device of claim 17, wherein the second detection pulse comprises a plurality of detection intervals that respectively correspond to the plurality of NFC types.

* * * * *